(12) United States Patent
Cilibrasi et al.

(10) Patent No.: US 9,870,232 B2
(45) Date of Patent: Jan. 16, 2018

(54) EXTENSIBLE METHOD AND SYSTEM FOR STORAGE METADATA

(75) Inventors: Rudi Cilibrasi, Sunnyvale, CA (US); David L. Marvit, San Francisco, CA (US)

(73) Assignee: FUJITSU LIMITED, Kawasaki (JP)

(*) Notice: Subject to any disclaimer, the term of this patent is extended or adjusted under 35 U.S.C. 154(b) by 58 days.

(21) Appl. No.: 13/482,832

(22) Filed: May 29, 2012

(65) Prior Publication Data

US 2013/0326189 A1 Dec. 5, 2013

(51) Int. Cl.
*G06F 9/44* (2006.01)
*G06F 3/06* (2006.01)

(52) U.S. Cl.
CPC .......... *G06F 9/4401* (2013.01); *G06F 3/0619* (2013.01); *G06F 3/0644* (2013.01); *G06F 3/0683* (2013.01)

(58) Field of Classification Search
CPC .......... G06F 11/3089; G06F 17/30076; G06F 17/30079; G06F 17/30238; G06F 9/5077; G06F 11/0712
See application file for complete search history.

(56) References Cited

U.S. PATENT DOCUMENTS

| | | | | |
|---|---|---|---|---|
| 7,325,038 | B1* | 1/2008 | Wang | 709/216 |
| 7,614,051 | B2* | 11/2009 | Glaum et al. | 717/175 |
| 7,876,647 | B2 | 1/2011 | Shinkai et al. | |
| 8,135,901 | B2 | 3/2012 | Oh et al. | |
| 2002/0071350 | A1* | 6/2002 | Wood | 369/24.01 |
| 2003/0115443 | A1* | 6/2003 | Cepulis et al. | 713/2 |
| 2006/0085796 | A1* | 4/2006 | Hoerle et al. | 719/313 |
| 2008/0196043 | A1* | 8/2008 | Feinleib et al. | 719/319 |
| 2009/0158021 | A1* | 6/2009 | Joshi | G06F 9/4401 713/2 |
| 2010/0205145 | A1* | 8/2010 | Eshita | 707/609 |
| 2010/0332558 | A1* | 12/2010 | Adams | 707/803 |
| 2011/0047245 | A1* | 2/2011 | Abramson et al. | 709/219 |
| 2011/0307630 | A1* | 12/2011 | Lange et al. | 709/246 |

(Continued)

FOREIGN PATENT DOCUMENTS

| | | |
|---|---|---|
| JP | 2005-004870 | 1/2005 |
| JP | 2009-116873 | 5/2009 |
| JP | 2011-258103 | 12/2011 |

OTHER PUBLICATIONS

Dr. Ultich Straub, LBA and CHS format, LBA mapping, Nov. 13, 2011, http://www.boot-us.com/gloss11.htm.*

(Continued)

*Primary Examiner* — Ann J Lo
*Assistant Examiner* — Leandro Villanueva
(74) *Attorney, Agent, or Firm* — Maschoff Brennan

(57) ABSTRACT

According to an aspect of an embodiment, a system of using an extensible language to represent storage metadata includes a computer-readable storage medium and a processing device. The computer-readable storage medium may have stored thereon storage metadata. The processing device may be configured to write the storage metadata to the computer-readable storage medium in an extensible language format. The processing device may also be configured to manipulate the storage metadata in the extensible language format. The processing device may also be configured to transfer the storage metadata in the extensible language format.

16 Claims, 4 Drawing Sheets

(56) References Cited

U.S. PATENT DOCUMENTS

2012/0081740 A1* 4/2012 Takagi et al. ................ 358/1.15
2013/0067191 A1* 3/2013 Mehra et al. ................ 711/173
2014/0108917 A1* 4/2014 Style ................ G06F 17/30492
　　　　　　　　　　　　　　　　　　　　　　　　715/234

OTHER PUBLICATIONS

"JSON." Wikipedia, The Free Encyclopedia. Wikimedia Foundation, Inc. Apr. 29, 2012. Web. <http://en.wikipedia.org/wiki/Json>.
"XML." Wikipedia, The Free Encyclopedia. Wikimedia Foundation, Inc. May 3, 2012. Web. <http://en.wikipedia.org/wiki/Xml>.
Japanese Office Action from corresponding application No. 2013-109184, dated Feb. 14, 2017.

* cited by examiner

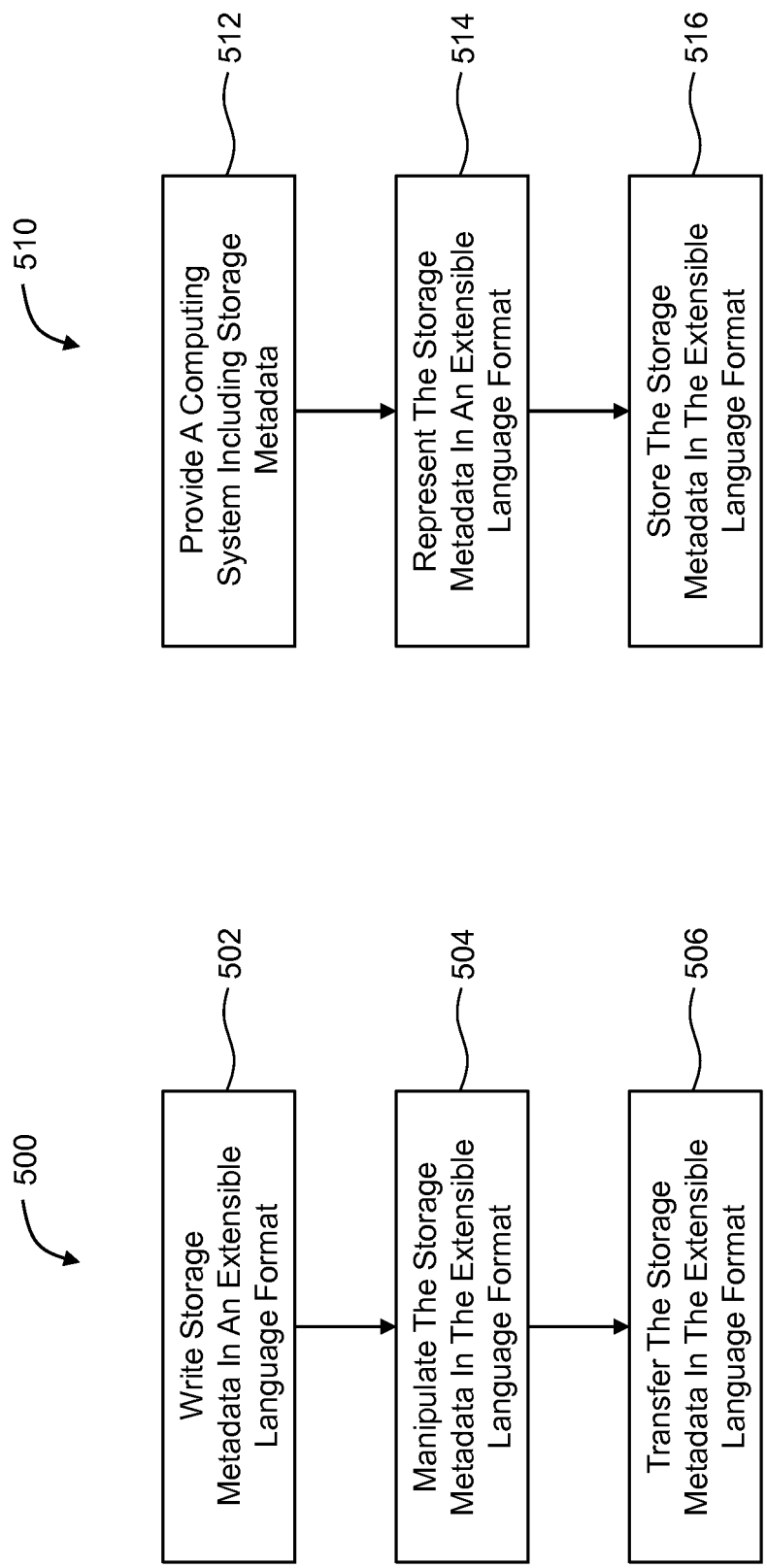

EXTENSIBLE METHOD AND SYSTEM FOR STORAGE METADATA

FIELD

The embodiments discussed herein are related to data storage formats.

BACKGROUND

The personal computer became popular in the 1980's and has continued to grow in importance and deployment scope to the present time. A wide variety of operating systems and storage formats have been developed to enable diverse uses of storage and networking hardware to form the Internet. Popular examples of such operating systems include Microsoft Windows, Linux, and Mac OS/X, but also include a wide array of less-popular variants. All of these operating systems share two common features: they have to be able to boot and they have to be able to access data stored on a disk drive. Unfortunately, a too-diverse compliment of confusing differences has resulted from the proliferation of operating-system specific automatic utilities to manipulate the metadata necessary to support the foregoing operations. Without a functioning boot system, an operating system may be unable to start. Without a functioning disk drive partition and file system metadata record, an operating system may be unable to provide access to the data it has stored. Even though many utilities have been written to support both of these operations, none have been designed to support extensibility. The lack of support for extensibility limits interoperability between diverse operating systems and machine architectures.

The limited interoperability has resulted in a tremendous increase in complexity and a decrease in reliability of booting and mounting initial file systems for home users as well as server engineers and has increased system administration cost considerably.

One simple example is the "fdisk" utility or command. This command is named identically in both Windows and Linux. Unfortunately, the behavior of the fdisk command varies between Windows and Linux. For example, both versions of the fdisk command read and write MBR and EBR format partition information to a hard disk drive, but they each use different command-line options and different interactive command menus. Within the MBR partition table there are both logical block address (LBA) sector numbers and Cylinder-Head-Sector (CHS) addresses. The CHS addresses are interpreted differently in different runtime environments and operating systems; on bootup, the basic input/output system (BIOS) typically uses CHS addresses. Most modern operating systems ignore CHS values in the partition table entirely but print confusing diagnostic messages when they disagree with LBA addresses. There is a difference in interpretation of one in the cylinder number among some versions of DOS as documented by the Linux sfdisk command manual page. There are at least four popular disk partitioning variations under Linux called "fdisk", "cfdisk", "sfdisk", and "gdisk". These all have slightly different behavior and are difficult for the beginning user to distinguish because of the similarity of names and similarity to the Windows variation. Now that Unix shells are available under Windows through lookalike systems such as Cygwin, there is a great deal of risk and confusion associated with using automated shell scripts to manipulate disk drive partitions. A frequent outcome of automatic partition table manipulation is loss of one or more operating systems on a shared drive.

It is common for advanced users to install more than one operating system on their computer because hard drives have grown in size and lowered in cost faster than operating systems storage footprint over the years. As a result, during installation or recovery, modifications may be needed to disk drive partitioning and booting sequences to allow the user to select which system is desired. Widespread use of emulation systems, supported in CPU hardware through features such as the Intel Virtualization Technology (VT) CPU features, has only added to the complexity and risk associated with performing boot block and partition-table modifications. Operating systems should be aware of each other and cooperate when manipulating these system-critical areas, but the current plethora of different commands, formats, and interpretations of the binary data hinders such interoperation.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a system of using an extensible language to represent storage metadata includes a computer-readable storage medium and a processing device. The computer-readable storage medium may have stored thereon storage metadata. The processing device may be configured to write the storage metadata to the computer-readable storage medium in an extensible language format. The processing device may also be configured to manipulate the storage metadata in the extensible language format. The processing device may also be configured to transfer the storage metadata in the extensible language format.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 5A is a flowchart of an example method of using an extensible language to represent storage metadata; and FIG. 5B is a flowchart of another example method of using an extensible language to represent storage metadata.

DESCRIPTION OF EMBODIMENTS

Embodiments of the present invention will be explained with reference to the accompanying drawings.

Figure 1:
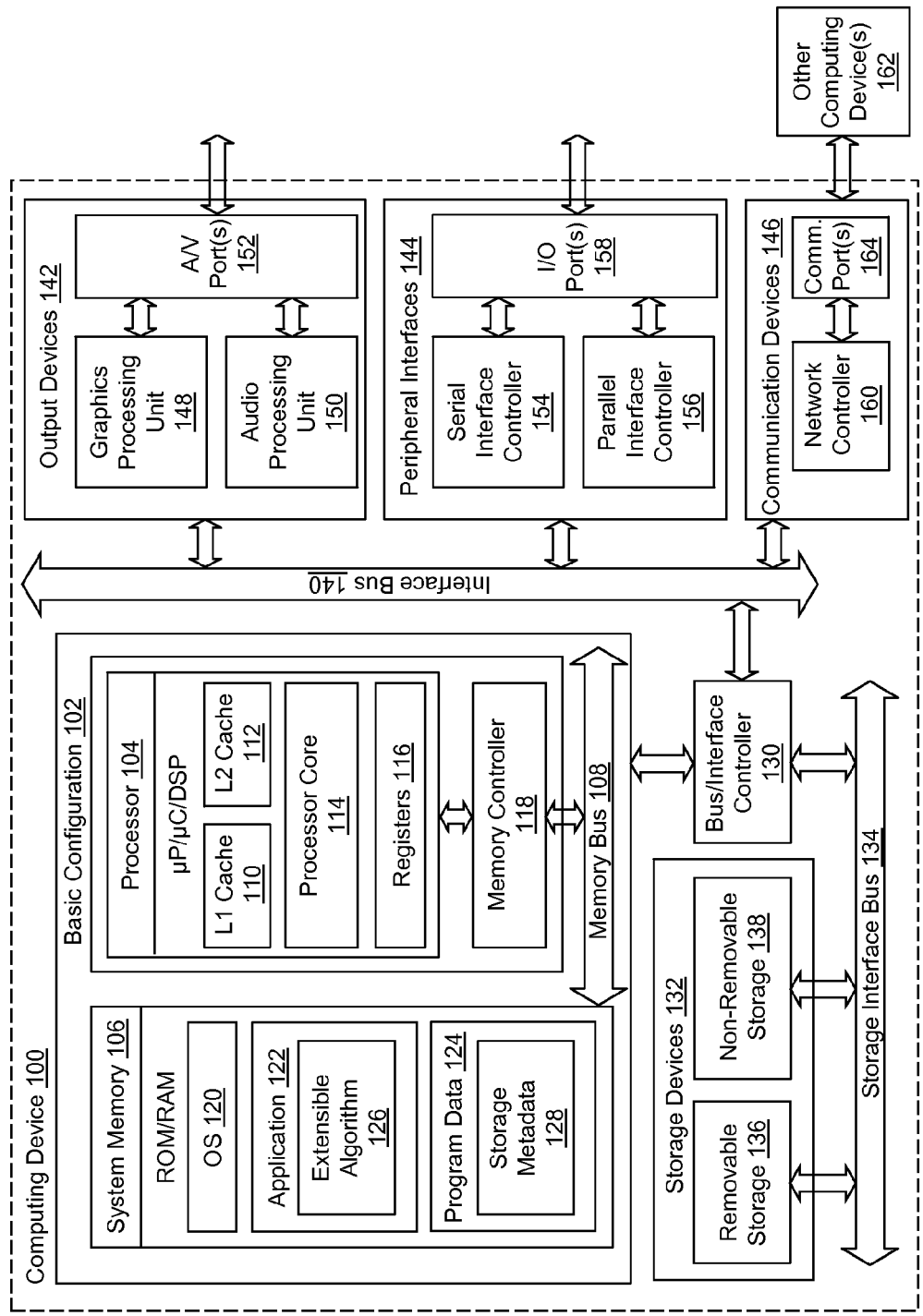
FIG. 1 is a block diagram illustrating an example computing system that is arranged for using an extensible language to represent storage metadata.

FIG. 1 is a block diagram illustrating an example computing system 100 that is arranged for using an extensible language to represent storage metadata in accordance with the present disclosure. The storage metadata may be, for example, system critical metadata. In a very basic configuration 102, the computing system 100 may include one or more processors 104 and a system memory 106. A memory bus 108 may be used for communicating between the processor 104 and the system memory 106.

Depending on the desired configuration, the processor 104 may be of any type including but not limited to a microprocessor (µP), a microcontroller (µC), a digital signal processor (DSP), or any combination thereof. The processor 104 may include one more levels of caching, such as a level one cache 110 and a level two cache 112, a processor core (or cores) 114, and registers 116. An example processor core 114 may include an arithmetic logic unit (ALU), a floating point unit (FPU), a digital signal processing core (DSP Core), or any combination thereof. An example memory controller 118 may also be used with the processor 104, or in some implementations the memory controller 118 may be an internal part of the processor 104. The processor 104 may be configured to perform one or more of the operations described herein by, for example, executing computer instructions or code loaded into the system memory 106 and/or by executing computer instructions or code line-by-line without using the system memory 106.

Depending on the desired configuration, the system memory 106 may be of any type including but not limited to volatile memory (such as Random Access Memory (RAM)), non-volatile memory (such as Read Only Memory (ROM), flash memory, etc.) or any combination thereof. The system memory 106 may include an operating system 120, one or more applications 122, and program data 124. The application 122 may include an extensible algorithm 126 that is arranged to perform the functions as described herein including one or more of those described with respect to FIGS. 5A-5B. For example, the application 122 may be executed by the processor 104 to cause the computing system 100 to perform the functions as described herein. The program data 124 may include storage metadata 128 that may be written, manipulated and/or transferred in an extensible language format, e.g., by the processor 104, as is described herein. In some embodiments, the application 122 may be arranged to operate with the program data 124 on the operating system 120 such that the storage metadata 128 may be represented using the extensible language format and/or may be written, manipulated and/or transferred in the extensible language format. Before describing the use of the extensible language format for the storage metadata 128 in more detail, various optional components, features and/or functionality of the computing system 100 of FIG. 1 according to some embodiments will be described.

The computing system 100 may have additional features or functionality, and additional interfaces to facilitate communications between the basic configuration 102 and other devices and interfaces. For example, a bus/interface controller 130 may be used to facilitate communications between the basic configuration 102 and one or more data storage devices 132 via a storage interface bus 134. The data storage devices 132 may be removable storage devices 136, non-removable storage devices 138, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer-readable instructions, data structures, program modules, or other data.

In some embodiments, storage metadata may be stored on, written to, and/or transferred from one or more of the data storage devices 132 in a compressed binary format and/or in an extensible language format as described in more detail below. Briefly, for example, the computing system 100 may be provided with storage metadata stored on one of the data storage devices 132 in a compressed binary format, transferred to the system memory 106 and/or the processor 104 to be translated to the extensible language format, and then written in the extensible language format to one of the data storage devices 132.

The system memory 106, the removable storage devices 136 and the non-removable storage devices 138 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing system 100. Any such computer storage media may be part of the computing system 100.

The computing system 100 may also include an interface bus 140 for facilitating communication from various interface devices (e.g., output devices 142, peripheral interfaces 144, and/or communication devices 146) to the basic configuration 102 via the bus/interface controller 130. Example output devices 142 include a graphics processing unit 148 and an audio processing unit 150, which may be configured to communicate to various external devices such as a display or speakers via one or more A/V ports 152. Example peripheral interfaces 144 include a serial interface controller 154 or a parallel interface controller 156, which may be configured to communicate with external devices such as input devices (e.g., keyboard, mouse, pen, voice input device, touch input device, etc.) or other peripheral devices (e.g., printer, scanner, etc.) via one or more I/O ports 158. An example communication device 146 includes a network controller 160, which may be arranged to facilitate communications with one or more other computing systems 162 over a network communication link via one or more communication ports 164.

The network communication link may be one example of a communication media. Communication media may typically be embodied by computer-readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer-readable media as used herein may include both storage media and communication media.

The computing system 100 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. The computing system 100 may also be implemented as a personal computer including both laptop computer and non-laptop computer configurations.

Figure 2:
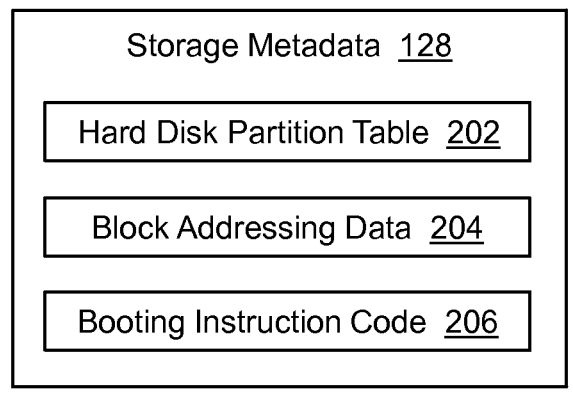
FIG. 2 illustrates an example embodiment of the storage metadata of FIG. 1.

FIG. 2 illustrates an example embodiment of the storage metadata 128 of FIG. 1. As described above, the storage metadata 128 may be stored in one or more data storage devices 132 such as in removable storage 136 and/or in non-removable storage 138. Alternately or additionally, the storage metadata 128 may be loaded into the system memory 106. Moreover, the storage metadata 128 may be represented in a compressed binary format, an example of which is described in more detail with respect to FIG. 3, in an extensible language format, an example of which is described in more detail with respect to FIG. 4, or in multiple formats such as in both a compressed binary format and an extensible language format.

In the illustrated embodiment of FIG. 2, the storage metadata 128 includes one or more hard disk partition tables 202, one or more block addressing data 204, and booting instruction code 206. In other embodiments, the storage metadata 128 may include some, but not all, of the hard disk partition table 202, the block addressing data 204, and/or the booting instruction code 206, and/or the storage metadata 128 may include some different components than those illustrated in FIG. 2.

The hard disk partition table 202 may include data describing partitions of a disk drive or other storage device, such as may be included as one or more of the data storage devices 132 of FIG. 1. The hard disk partition table 202 may include, but is not limited to, a master boot record (MBR) partition table, an extended boot record (EBR) partition table, a globally unique identifier (GUID) partition table (GPT), a Berkeley Software Distribution (BSD) disklabel, an Apple Partition Map (APM), or the like or any combination thereof.

The block addressing data 204 may include data configured to describe locations of blocks of data stored on a disk drive or other storage device, such as may be included as one or more of the data storage devices 132 of FIG. 1. The block addressing scheme may include, but is not limited to, cylinder-head-sector (CHS) block addressing data, logical block address (LBA) block addressing data, or the like or any combination thereof.

The booting instruction code 206 may include data configured to control booting of a computing system, such as the computing system 100 of FIG. 1. The booting instruction code may include, but is not limited to, boot sector data, a Basic Input/Output System (BIOS) Parameter Block (BPB), or the like or any combination thereof.

Figure 3:
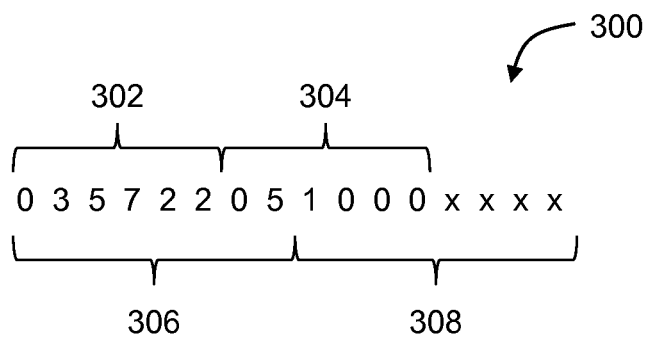
FIG. 3 illustrates an example embodiment of storage metadata in a compressed binary format.

FIG. 3 illustrates an example embodiment of storage metadata in a compressed binary format 300 (hereinafter "storage metadata 300"). Storage metadata in a compressed binary format, such as the storage metadata 300, may be included in legacy computing systems and/or other computing systems. As described in greater detail below, the storage metadata 300 may be translated to and represented in an extensible language format to substantially eliminate issues arising from representing storage metadata in a compressed binary format.

Providing storage metadata such as the storage metadata 300 in a compressed binary format may cause errors and/or lead to data loss, an example of which is described in the following discussion of FIG. 3. Compressed binary formats generally minimize the storage footprint of storage metadata by including as little data as possible in the storage metadata. So long as operating systems, backup systems, repartitioning utilities, or other programs or systems understand the format, location, etc. of the storage metadata, the compressed nature of the storage metadata may not be problematic. However, when diverse operating systems, backup systems, repartitioning utilities or other programs or systems that understand or interpret storage metadata differently are run on the same computing system, problems may arise.

Consider, for example, the storage metadata 300 of FIG. 3. Some operating systems, backup systems, repartitioning utilities, or other programs or systems may interpret the storage metadata 300 as an MBR hard disk partition table and CHS block addressing data including a CHS-type start address 302 and a CHS-type end address 304 in a computer-readable storage medium where booting instruction code may be stored. Alternately or additionally, other operating systems, backup systems, repartitioning utilities, or other programs or systems may interpret the storage metadata 300 as a GPT hard disk partition table and LBA block addressing data including an LBA-type start address 306 and an LBA-type end address 308 in the computer-readable storage medium where booting instruction code may be stored. Still other operating systems, backup systems, repartitioning utilities, or other programs or systems may not even recognize the storage metadata 300 as such. When the storage metadata 300 is misinterpreted or unrecognized, incorrect data may be loaded from misinterpreted storage addresses, the storage metadata 300 may be overwritten, and/or other issues may arise. Analogous issues may arise when storage metadata is represented in a proprietary or non-extensible format. Accordingly, representing storage metadata in compressed binary format or in proprietary or otherwise non-extensible formats may lead to errors and/or data loss to the extent the storage metadata may not be understood and/or may not be recognized as such.

According to some embodiments described herein, however, extensible language formats may be used to represent storage metadata to resolve disagreements in interpretation of the underlying compressed binary formats in a safe and programmatically convenient way that may allow for, among other things, continued growth of operating systems in heterogeneous environments. Alternately or additionally, some embodiments may clearly identify the storage metadata and clarify the meaning of the storage metadata at the expense of a slightly larger storage footprint than for equivalent storage metadata stored in a compressed binary format.

The extensible language format may include, but is not limited to, an eXtensible Markup Language (XML) format, a JavaScript Object Notation (JSON) format, or the like or any combination thereof. Alternately or additionally, the extensible language format may represent storage metadata with key-value pairs. Each key of a key-value pair may include a string identifying a given parameter, attribute or aspect of the storage metadata and the corresponding value may include a value of the identified parameter, attribute or aspect. In these and other embodiments, the extensible language format may be human readable.

Figure 4:
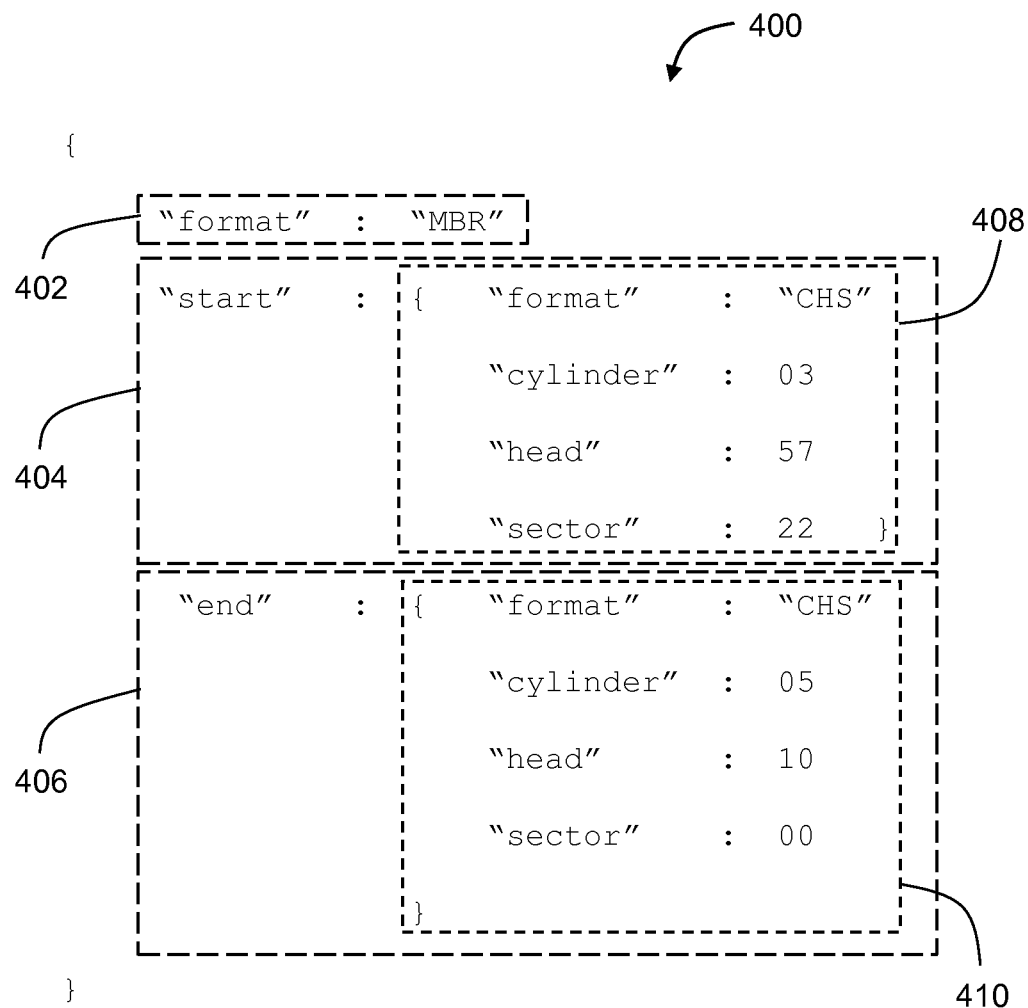
FIG. 4 illustrates an example embodiment of the storage metadata of FIG. 3 in an extensible language format.

FIG. 4 illustrates an example embodiment of the storage metadata 300 of FIG. 3 in an extensible language format 400 (hereinafter "storage metadata 400"). In the example of FIG. 4, the storage metadata 400 may be represented in a JSON format including one or more key-value pairs. For example, first, second and third key-value pairs 402, 404, 406 are illustrated in FIG. 4, although more or less than three key-value pairs 402, 404, 406 may be included in other embodiments. Each of the first, second and third key-value pairs 402, 404, 406 includes a key made up of a string, including "format", "start" or "end", respectively.

The first key-value pair 402 may identify a "format" of a hard disk partition table of a computer-readable storage medium. In the illustrated embodiment, the format may be identified by a value of the first key-value pair 402 as "MBR" format.

The second key-value pair 404 may identify a "start" address on the computer-readable storage medium and the third key-value pair 406 may identify an "end" address on the computer-readable storage medium where booting instruction code is stored. In the illustrated embodiment, a value in the second key-value pair 404 may include a start object 408 and a value in the third key-value pair 406 may include an end object 410.

The start object 408 may include, in the example of FIG. 4, a format key-value pair identifying a "format" of the start address identified by the second key-value pair 404 as having a particular block addressing format ("CHS" in this example), as well as one or more other key-value pairs identifying the specific start address. In the example of CHS block address formatting, for example, the start object 408 may further include a cylinder key-value pair identifying a "cylinder" of the start address as a particular cylinder ("03" in this example), a head key-value pair identifying a "head" of the start address as a particular head ("57" in this example), and a sector key-value pair identifying a "sector" of the start address as a particular sector ("22" in this example).

Analogously, the end object 410 may include, in the example of FIG. 4, a format key-value pair identifying a "format" of the end address identified by the third key-value pair 406 as having a particular block addressing format ("CHS" in this example), as well as one or more other key-value pairs identifying the specific end address. In the example of the CHS block address formatting, for example, the end object 410 may further include a cylinder key-value pair identifying a "cylinder" of the end address as a particular cylinder ("05" in this example), a head key-value pair identifying a "head" of the end address as a particular head ("10" in this example), and a sector key-value pair identifying a "sector" of the end address as a particular sector ("00" in this example).

FIG. 5A is a flowchart of an example method 500 of using an extensible language to represent storage metadata. The method 500 and/or variations thereof may be implemented, in whole or in part, by a computing system, such as the computing system 100 described herein. Alternately or additionally, the method 500 and/or variations thereof may be implemented, in whole or in part, by a processor or other processing device, such as the processor 104 of FIG. 1. Although illustrated as discrete blocks, various blocks may be divided into additional blocks, combined into fewer blocks, or eliminated, depending on the desired implementation.

The method 500 may begin at block 502, in which storage metadata may be written in an extensible language format. For example, the storage metadata may be written in the extensible language format to a computer-readable storage medium, such as the system memory 106, the removable storage 136, or the non-removable storage 138 of FIG. 1.

In block 504, the storage metadata may be manipulated in the extensible language format. In some embodiments, manipulating the storage metadata in the extensible language format may include repartitioning hard disk partition tables represented in the extensible language format. Because the storage metadata is represented in the extensible language format, disagreements regarding the interpretation of the storage metadata by different systems, etc., that might otherwise arise if the storage metadata were in a compressed binary format may be resolved, or more particularly, avoided ab initio.

In block 506, the storage metadata in the extensible language format may be transferred. In some embodiments, transferring the storage metadata in the extensible language format may include transferring the storage metadata in the extensible language format from a server to a client over a network. By transferring the storage metadata in the extensible language format, compatibility between different systems can be improved and/or software bugs can be reduced or avoided when more than one program or system is used to manipulate the same piece of storage metadata.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, the method 500 may further include, prior to writing the storage metadata to the computer-readable storage medium in the extensible language format, translating the storage metadata from a compressed binary format to the extensible language format. In these and other embodiments, the storage metadata in the compressed binary format may be previously stored on the computer-readable storage medium and may be translated by, e.g., the extensible algorithm 126 of FIG. 1, to the extensible language format for future use to avoid disagreements regarding the interpretation of the storage metadata.

Alternately or additionally, prior to writing the storage metadata in the extensible language format to the computer-readable storage medium, the storage metadata may initially be stored on the computer-readable storage medium in a platform-specific key-value coded format, or in a proprietary format, or the like. In these and other embodiments, the method 500 may further include translating the storage metadata stored in the platform-specific key-value coded format (or the proprietary or other format) to the extensible language format prior to writing the storage metadata in the extensible language format to the computer-readable storage medium.

FIG. 5B is a flowchart of another example method 510 of using an extensible language to represent storage metadata. The method 510 and/or variations thereof may be implemented, in whole or in part, by a computing system, such as the computing system 100 described herein. Alternately or additionally, the method 510 and/or variations thereof may be implemented, in whole or in part, by a processor or other processing device, such as the processor 104 of FIG. 1. Although illustrated as discrete blocks, various blocks may be divided into additional blocks, combined into fewer blocks, or eliminated, depending on the desired implementation.

The method 510 may begin at block 512 in which a computing system is provided, the computing system including storage metadata.

In block 514, the storage metadata may be represented in an extensible language format. Representing the storage metadata in the extensible language format may include using a key-value pair, or more particularly, a key and a value, to represent each of multiple components of the storage metadata.

In block 516, the storage metadata in the extensible language format may be stored in the computing system.

Although not illustrated in FIG. 5B, the method 510 may further include, prior to representing the storage metadata using the extensible language, translating the storage metadata from a compressed binary format to the extensible language format.

In some embodiments, the method 510 of FIG. 5B may include a repartitioning utility that understands the extensible language format reading the storage metadata stored in the extensible language format. The repartitioning utility may then repartition a computer-readable storage medium of the computing system without losing any data stored on the computer-readable storage medium and without writing over any of the storage metadata.

In some embodiments, the computing system may include a computer-readable storage medium and the storage metadata may include first and second block addressing data for locating data stored in the computer-readable storage medium. The first block addressing data may be risked by storing and/or instantiating on the computing system operating systems that use the second block addressing data and that don't understand the extensible markup language. In these and other embodiments, the method 510 of FIG. 5B may include storing and/or instantiating a first operating system on the computing system that uses the first block addressing data. The first operating system may be configured to understand the extensible language format. A second operating system may also be stored and/or instantiated on the computing system, the second operating system using the second block addressing data. The second operating system may be configured to understand the extensible markup language format such that the first block addressing data may not be risked by instantiating the second operating system on the computing system.

Accordingly, some embodiments described herein may include disk partitioning and boot block manipulation programs that read and write storage metadata in the JSON format or other extensible language format. These and other embodiments may provide greater compatibility across languages, operating systems, and runtime environments than systems in which storage metadata is read and written in compressed binary formats, platform-specific key-value pair formats, and/or proprietary formats.

In some embodiments, representing storage metadata in an extensible language format may allow multiple operating systems with disparate and sometimes contradictory assumptions about storage metadata to be run on the same computing system without risking the storage metadata or other data. Alternately or additionally, emulators, virtual machines, repartitioning utilities, or other programs with disparate and perhaps contradictory assumptions about storage metadata may be run on the same computing system without risking storage metadata or other data by representing the storage metadata in the extensible language format.

These and other embodiments may eliminate or substantially reduce the risk, compared to systems in which storage metadata is represented in a compressed binary format, involved in boot menu adjustment, operating system installation, data storage addition, data migration, and/or repartitioning. Alternately or additionally, by representing storage metadata in an extensible language format rather than in a compressed binary format, datacenters and/or other systems may use advanced partition table formats to manage large and increasing arrays of disk drives potentially spread across different operating systems with less risk of data loss or downtime. Cloud services may use a variety of operating systems and reduce the risk and downtime of hardware upgrades by using an extensible language format as opposed to a compressed binary format.

As mentioned previously, in some embodiments, the storage metadata in the extensible language format may be human readable. By making the storage metadata human readable, the storage metadata may be relatively more user friendly and understandable to users and may give a new sense of safe consistency across different operating systems and hardware.

Alternately or additionally, software agents that understand the extensible language format may be able to do more automatically with or to the storage metadata in the extensible language format than might otherwise be possible with storage metadata in a compressed binary format since the software agents may be able to understand more without making guesses.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include tangible computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions include, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A system of using an extensible language to represent storage metadata, the system comprising:
   a computer-readable storage medium having stored thereon storage metadata; and
   a processing device configured to:
      obtain the storage metadata that is written in a platform-specific key-value coded, compressed binary format, interpretations of the platform-specific key-value coded format by two or more operating systems on the system cause an interpretation disagreement in the storage metadata, the storage metadata includes a hard disk partition table including data describing partitions of the hard disk, block addressing data for locating data stored in the computer-readable storage medium, and booting instruction code including data configured to control booting of the system;
      resolve the interpretation disagreement in the storage metadata with respect to the two or more operating systems, wherein when resolving the interpretation disagreement in the storage metadata, the processing device is configured to:
         translate the hard disk partition table to an extensible language format that includes generating a first key-value pair that identifies a format of the hard disk partition table;
         translate the block addressing data to the extensible language format that includes generating a second key-value pair that identifies a start address on the computer-readable storage medium where the booting instruction code is stored; and
         translate the booting instruction code to the extensible language format that includes generating a third key-value pair that identifies an end address on the computer-readable storage medium where the booting instruction code is stored;
      write the storage metadata to the computer-readable storage medium in the extensible language format;
      manipulate, in the extensible language format, the translated hard disk partition table, block addressing data, and booting instruction code by repartitioning the translated hard disk partition table by a repartitioning utility; and
      transfer the translated hard disk partition table, block addressing data, and booting instruction code to an electronic device.

2. The system of claim 1, wherein the hard disk partition table comprises at least one of: a master boot record (MBR) partition table, an extended boot record (EBR) partition table, a globally unique identifier (GUID) partition table (GPT), a Berkeley Software Distribution (BSD) partition table, or an Apple Partition Map (APM) partition table.

3. The system of claim 1, wherein the block addressing data comprises at least one of cylinder-head-sector (CHS) block addressing data or logical block address (LBA) block addressing data.

4. The system of claim 1, wherein the booting instruction code comprises at least one of a BIOS Parameter Block (BPB) or boot sector data.

5. The system of claim 1, wherein the extensible language format includes eXtensible Markup Language (XML) format or JavaScript Object Notation (JSON) format.

6. The system of claim 1, wherein the extensible language format of the storage metadata includes a plurality of key-value pairs, including at least one of:
   the first key-value pair;
   the second key-value pair; or
   the third key-value pair.

7. The system of claim 6, wherein the second key-value pair comprises a start object and the third key-value pair comprises an end object, each of the start object and the end object comprising a plurality of key-value pairs including a format key-value pair identifying a format of block addressing data for locating data stored in the computer-readable storage medium.

8. The system of claim 7, wherein each of the start object and the end object further comprises:
   a cylinder key-value pair identifying a respective cylinder of the start or end address;
   a head key-value pair identifying a respective head of the start or end address; and
   a sector key-value pair identifying a respective sector of the start or end address.

9. The system of claim 1, further comprising:
   first software comprising a first operating system, virtual machine, emulator, or repartitioning utility stored on the computer-readable storage medium and executable by the processing device; and
   second software comprising a second operating system, virtual machine, emulator, or repartitioning utility stored on the computer-readable storage medium and executable by the processing device,
   wherein:
      the first software has first assumptions about the storage metadata;
      the second software has second assumptions about the storage metadata that are contradictory to the first assumptions; and
      the first software and the second software interpret the storage metadata in the extensible language format consistent with each other.

10. A method of using an extensible language to represent storage metadata, the method comprising:
    obtaining storage metadata that is written in a platform-specific key-value coded, compressed binary format, interpretations of the platform-specific key-value coded format by two or more operating systems on a computing system cause an interpretation disagreement in the storage metadata, the storage metadata includes a hard disk partition table including data describing partitions of the hard disk, block addressing data for locating data stored in the computer-readable storage medium, and booting instruction code including data configured to control booting of the system;
    resolving the interpretation disagreement in the storage metadata with respect to the two or more operating systems, the resolving including:
       translating the hard disk partition table to an extensible language format that includes generating a first key-value pair that identifies a format of the hard disk partition table;
       translating the block addressing data to the extensible language format that includes generating a second key-value pair that identifies a start address on a computer-readable storage medium where the booting instruction code is stored; and translating the booting instruction code to the extensible language format that includes generating a third key-value pair that identifies an end address on the computer-readable storage medium where the booting instruction code is stored;

representing the translated hard disk partition table, block addressing data, and booting instruction code by modifying the translated hard disk partition table in the extensible language format;

storing the translated hard disk partition table, block addressing data, and booting instruction code by modifying the translated hard disk partition table in the computing system; and manipulate, in the extensible language format, at least one of the translated hard disk partition table, block addressing data, and booting instruction code by repartitioning the translated hard disk partition table by a repartitioning utility that understands the extensible language format.

11. The method of claim 10, wherein representing the storage metadata in the extensible language format includes using a key and a value to represent each of multiple components of the storage metadata.

12. The method of claim 10, wherein the extensible language format is human readable.

13. The method of claim 10, wherein the computing system includes a computer-readable storage medium and the storage metadata includes first and second block addressing data for locating data stored in the computer-readable storage medium, the first block addressing data being risked by instantiating on the computing system operating systems that use the second block addressing data and that does not understand the extensible language format, the method further comprising:

storing a first operating system on the computing system that uses the first block addressing data, the first operating system configured to understand the extensible language format; and storing a second operating system on the computing system that uses the second block addressing data, the second operating system configured to understand the extensible language format such that the first block addressing data is not risked by instantiating the second operating system on the computing system.

14. A processor configured to execute computer instructions to cause a computing system to perform operations for using an extensible language to represent storage metadata, the operations comprising:

obtaining storage metadata that is written in a platform-specific key-value coded, compressed binary format, interpretations of the platform-specific key-value coded format by two or more operating systems on the computing system cause an interpretation disagreement in the storage metadata in response to the storage metadata, the storage metadata includes a hard disk partition table including data describing partitions of the hard disk, block addressing data for locating data stored in a computer-readable storage medium, and booting instruction code including data configured to control booting of the system;

resolving the interpretation disagreement in the storage metadata with respect to the two or more operating systems, the resolving including:
translating the hard disk partition table to an extensible language format that includes generating a first key-value pair that identifies a format of the hard disk partition table;

translating the block addressing data to the extensible language format that includes generating a second key-value pair that identifies a start address on the computer-readable storage medium where the booting instruction code is stored; and translating the booting instruction code to the extensible language format that includes generating a third key-value pair that identifies an end address on the computer-readable storage medium where the booting instruction code is stored;

writing the storage metadata to a computer-readable storage medium in the extensible language format;

manipulating, in the extensible language format, the translated hard disk partition table, block addressing data, and booting instruction code by repartitioning the translated hard disk partition table by a repartitioning utility; and transferring the translated hard disk partition table, block addressing data, and booting instruction code to an electronic device.

15. The processor of claim 14, wherein the extensible language format includes eXtensible Markup Language (XML) format or JavaScript Object Notation (JSON) format.

16. The processor of claim 14, wherein the extensible language format of the storage metadata includes a plurality of key-value pairs.

* * * * *